(12) United States Patent
Burnham (10) Patent No.: US 8,573,243 B2
(45) Date of Patent: Nov. 5, 2013

(54) FLUID DELIVERY DEVICE AND METHOD

(76) Inventor: Douglas Burnham, Leeds Yorkshire (GB)

(*) Notice: Subject to any disclaimer, the term of this patent is extended or adjusted under 35 U.S.C. 154(b) by 398 days.

(21) Appl. No.: 12/865,524

(22) PCT Filed: Jan. 20, 2009

(86) PCT No.: PCT/GB2009/050036
§ 371 (c)(1),
(2), (4) Date: Sep. 20, 2010

(87) PCT Pub. No.: WO2009/095704
PCT Pub. Date: Aug. 6, 2009

(65) Prior Publication Data
US 2011/0168267 A1  Jul. 14, 2011

Related U.S. Application Data

(60) Provisional application No. 61/027,880, filed on Feb. 12, 2008.

(30) Foreign Application Priority Data

Jan. 31, 2008 (GB) .................................. 0801770.9

(51) Int. Cl.
*F15D 1/00* (2006.01)
(52) U.S. Cl.
USPC .......... 137/15.12; 137/317; 137/318; 138/45; 138/46

(58) Field of Classification Search
USPC ............ 137/318, 15.12, 15.13, 317; 285/197; 138/44–46
See application file for complete search history.

(56) References Cited

U.S. PATENT DOCUMENTS

| | | | | |
|---|---|---|---|---|
| 1,898,935 | A * | 2/1933 | Brandriff | 137/318 |
| 2,100,495 | A * | 11/1937 | Stevenson | 138/46 |
| 2,683,622 | A * | 7/1954 | Dragon | 138/44 |
| 3,212,716 | A * | 10/1965 | Mills et al. | 137/268 |
| 3,455,054 | A * | 7/1969 | Tibbals, Jr. | 137/268 |
| 3,968,932 | A * | 7/1976 | Kimmell | 137/268 |
| 4,261,332 | A | 4/1981 | Stewart | |
| 4,419,233 | A | 12/1983 | Baker | |
| 4,730,636 | A * | 3/1988 | Volgstadt et al. | 137/15.14 |
| 6,511,372 | B2 * | 1/2003 | Leeds et al. | 138/46 |
| 7,291,261 | B1 | 11/2007 | Rhodes | |
| 7,690,392 | B1 * | 4/2010 | Sarkiss | 137/268 |

FOREIGN PATENT DOCUMENTS

| | | |
|---|---|---|
| FR | WO2006/016032 A1 | 2/2006 |
| GB | WO2009/095704 A2 | 8/2009 |
| WO | WO99/29403 | 6/1999 |

* cited by examiner

*Primary Examiner* — Kevin Lee
(74) *Attorney, Agent, or Firm* — Shumaker, Loop & Kendrick, LLP (57) ABSTRACT

A fluid delivery device for fixing to and delivering a fluid into a pressurized pipe, the device operable for restricting a flow of fluid through the pipe, thereby generating a restricted flow region within the pipe, the device including a delivery conduit arranged to open into the restricted flow region.

16 Claims, 7 Drawing Sheets

FIG. 1

PRIOR ART

FIG. 2

PRIOR ART

FLUID DELIVERY DEVICE AND METHOD

TECHNICAL FIELD AND BACKGROUND OF THE INVENTION

The present invention relates to a fluid delivery device and a method of delivering fluid. Particularly, but not exclusively, the invention relates to the delivery of a fluid into a pressurised fluid line, such as for use in the swimming pool industry.

Delivery of fluids into a pressurised fluid line is known. For example, in the swimming pool industry, it is known to add fluids, such as sterilising chemical solutions, into the water to maintain clean, sterilised water. In such scenarios, it is usual to add the chemical solution to a pressurised return line, which returns heated, filtered water to a pool.

Figure 1:
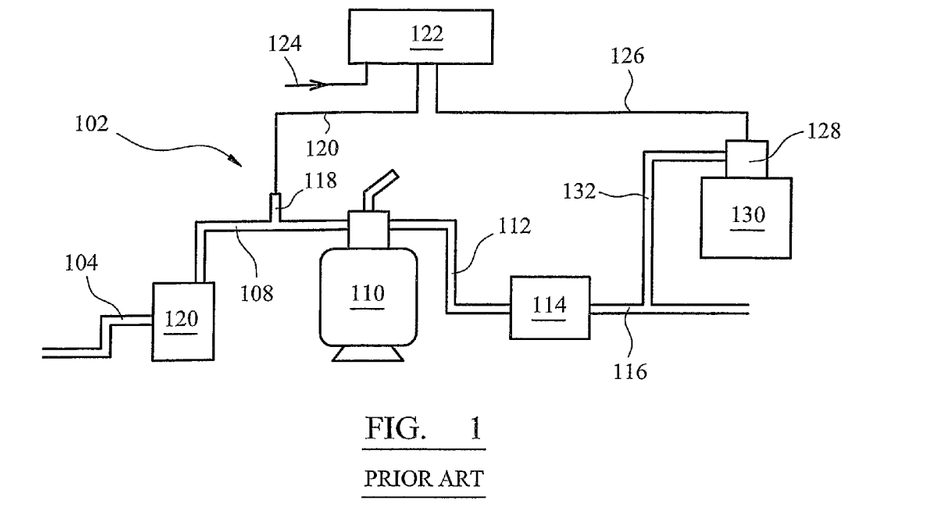
FIG. 1 shows a schematic representation of a prior art fluid delivery system.

Known methods of delivering fluids into a pressurised fluid line include employing an auxiliary pump to pump the fluid at pressure into the line. An example of such a system is shown in FIG. 1 and described in the specific description of the figures, hereunder. Such systems, while delivering generally adequate performance, require the addition and operation of auxiliary pumps, which represent a large expense to purchase, install and run and which are susceptible to mechanical failure.

Figure 2:
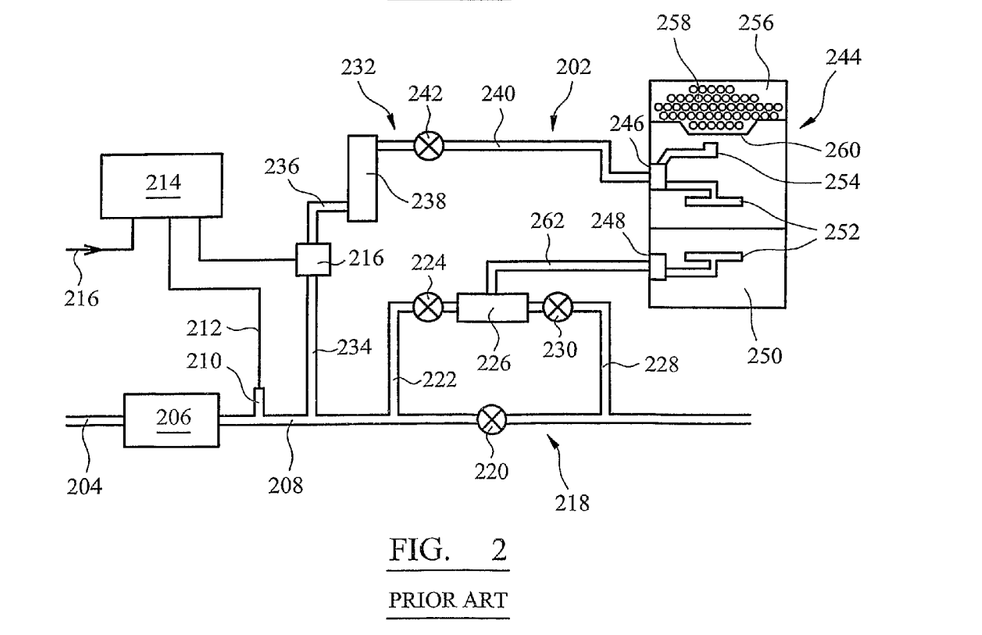
FIG. 2 shows a schematic representation of an alternative prior art fluid delivery system.

A further known system uses a venturi unit. An example of such a system is shown in FIG. 2 and described in the specific description of the figures hereunder. Such systems do not require the use of auxiliary pumps, but do require that major modifications are made to return pipes with the addition of a plurality of auxiliary components. The installation of such systems can be labour intensive to install and occupy large amounts of space, often in areas where space is scarcely available and access is restricted.

BRIEF SUMMARY OF THE INVENTION

It is an object of aspects of the present invention to provide a solution to the above or other problems.

According to a first aspect of the present invention there is provided a fluid delivery device for fixing to and delivering a fluid into a pressurised pipe, the device comprising flow restriction means operable to restrict a flow of fluid through the said pipe, thereby generating a restricted flow region within the pipe at or around the position of the flow restriction means, as compared to an unrestricted flow upstream of the device, the device further comprising a delivery conduit arranged to open into or proximal to the said restricted flow region.

The flow restriction means may be adjustable so as to alter the amount of restriction of the flow within the pipe. Preferably, the flow restriction means comprises a flow restriction member, which preferably, in use, extends into the pipe. The flow restriction means may be arranged to extend into the pipe at an angle generally perpendicular to a longitudinal axis thereof.

The flow restriction member comprise a piston, which may be arranged to adjustably extend into the pipe. The piston may be cylindrical in cross section. The flow restriction member may comprise flaring means, which may be operable to spread outward to occupy a greater volume within the pipe. The flaring means may be adjustable.

Advantageously, the adjustable flow restriction member and the flaring means allow the flow through the pipe to be adjusted, thus further allowing control of flow through the restricted flow region.

The device may further comprise an outlet, preferably operable to allow fluid from within the pipe out of the pipe. Preferably, the outlet is situated upstream of the delivery conduit.

In one embodiment, fluid removed from the pressurised pipe may be re-circulated into the pressurized pipe via the outlet, preferably by re-circulating the fluid into the delivery conduit. In this manner, a portion of fluid may be treated, such as by being chemically treated, while outside of the pressurised pipe environment. Flow of fluid through the outlet may be controlled by a switch, which may comprise a valve, preferably a solenoid valve. The switch is preferably arranged at a position in the outlet downstream of the delivery conduit. In one embodiment, the outlet joins the delivery conduit in a "T junction" type arrangement. The switch may be arranged to regulate the flow of fluid into the pressurized pipe via the delivery conduit by feeding fluid from the outlet directly into the delivery conduit, thus satisfying suction occurring at the opening of the conduit. Alternatively, when the switch is closed, fluid being thereby prevented from flowing through the outlet, suction observed at the delivery conduit may be operable to cause suction from an alternative supply, that may be attached to the delivery conduit.

The device may comprise a plurality of delivery conduits. For example, the device may comprise 2, 3, 4, 5, 6 or more delivery conduits. Each of the delivery conduits may be arranged to open into or proximal to the said restricted flow region.

The device may further comprise securing means operable to secure the device to the pipe.

The flow interruption means may comprise an aperture through which the fluid in the pipe may travel. The aperture may be generally funnel shaped. The aperture may comprise a tapered region, preferably tapering in a downstream direction, thus preferably causing fluid flowing therethrough to accelerate in a downstream direction. The aperture may comprise a region of generally constant cross section.

In one embodiment, the flow interruption means may comprise an aperture having a tapered section that preferably connects to a section of generally constant cross section. Such an aperture may be arranged such that a longitudinal axis therethrough is generally parallel with a longitudinal axis of the pipe. Such an aperture may be arranged such that the fluid flowing through the pipe accelerates in a downstream direction through the tapered section.

The delivery conduit may open into the aperture. Advantageously, the acceleration of the fluid through the aperture causes a reduction in pressure, thus causing suction in the delivery conduit.

In an alternative embodiment, the delivery conduit may open proximal to a lower extent of the flow restriction member, preferably at a downstream side thereof. In such an embodiment the flow may be restricted between the lower extent of the flow restriction member and the pipe wall. Advantageously, the turbulent flow around the lower extent of the flow restriction member causes fluid to be draw out of the delivery conduit.

The delivery conduit may be situated within the flow restriction means.

The device may be fitted to a pipe by inserting the flow restriction means into the pipe and adding a saddle fitting about the pipe. Alternatively, the device may be fitted between two ends of pipe to thereby form a continuous pipe.

Advantageously, the device does not require auxiliary pumps to add fluids into the pipe, because the arrangement of the device and the delivery conduit causes a suction in the delivery conduit, thus the fluids are drawn in. Further, the device adds fluid into the pipe without diverting the pressurized fluids in the pipe to an alternative path. This results in better mixing of the two fluids, because small amounts of fluids from the delivery conduit enter the entire volume of the resident fluid at a position where the flow of the fluids is very irregular and turbulent, thus very good for mixing.

The fluid delivery device may be a dosing device, such as a chemical dosing device. Preferably, the fluid delivery device is a swimming pool dosing device for dosing fluids into swimming pool water.

The term fluid as used herein refers to substances that behave as fluids such as gases, liquids and powders. Preferably, gases and liquids. Most preferably liquids.

According to a further aspect of the present invention there is provided a pipe and fluid delivery device assembly comprising a pipe operable to allow a fluid to travel therethrough under pressure, the pipe having a fluid delivery device fixed thereto, the fluid delivery device comprising flow restriction means operable to restrict a flow of fluid through the said pipe, thereby generating a restricted flow region within the pipe at or around the position of the flow restriction means, as compared to an unrestricted flow upstream of the device, the device further comprising a delivery conduit arranged to open into or proximal to the said restricted flow region.

According to a further aspect of the present invention there is provided a method of delivering a fluid into a pressurized pipe, the method comprising adding flow restriction means within the pipe to thereby generate a restricted flow region within the pipe at or around the position of the flow restriction means, as compared to an unrestricted flow upstream of the flow restriction means, arranging a delivery conduit to open into or proximal to the said restricted flow region.

According to a further aspect of the present invention there is provided a swimming pool water dosing device for fixing to and dosing a fluid into a pipe containing swimming pool water, the device comprising flow restriction means operable to restrict a flow of the swimming pool water through the said pipe, thereby generating a restricted flow region within the pipe at or around the position of the flow restriction means, as compared to an unrestricted flow upstream of the device, the device further comprising a delivery conduit arranged to open into or proximal to the said restricted flow region to deliver the said fluid into the swimming pool water.

According to a further aspect of the present invention there is provided a method of dosing a chemical solution into a swimming pool the method comprising adding flow restriction means within a pressurized pipe to thereby generate a restricted flow region within the pipe at or around the position of the flow restriction means, as compared to an unrestricted flow upstream of the flow restriction means, arranging a delivery conduit to open into or proximal to the said restricted flow region.

According to a further aspect of the present invention there is provided a swimming pool monitoring and dosing system, the system comprising means to monitor a chemical composition of swimming pool water upstream of a dosing device and arranged, upon detection of a chemical composition outside a predetermined parameter, to cause a fluid to be dosed into the swimming pool water via a swimming pool water dosing device, the device being fixed to a swimming pool water pipe and comprising flow restriction means operable to restrict a flow of the swimming pool water through the said pipe, thereby generating a restricted flow region within the pipe at or around the position of the flow restriction means, as compared to an unrestricted flow upstream of the device, the device further comprising a delivery conduit arranged to open into or proximal to the said restricted flow region to deliver the said fluid into the swimming pool water.

According to a yet further aspect of the present invention there is provided a method of attaching a fluid delivery device to a pressurized pipe, the method comprising:

arranging a saddle about a pressurised pipe, the saddle comprising an access point to allow hole forming apparatus access to the pressurised pipe, arranging hole forming apparatus about the access point of the saddle, the hole cutting apparatus being substantially sealed with the saddle via a first seal;

using the hole forming apparatus to form a hole in a wall of the pressurized pipe;

forming a secondary seal in the access point at a position between the formed hole and the first seal;

removing the first seal and inserting flow interruption means of the fluid delivery device into the access point of the saddle, thereby forming a tertiary seal.

The method may further comprise removal of the secondary seal. The flow interruption means may be inserted into the pressurized pipe via the hole formed in the wall of the pressurized pipe.

The hole forming apparatus may comprise a drill. The hole forming apparatus may be removed, preferably prior to insertion of the flow restriction member into the access point.

The access point of the saddle may comprise a cylindrical bore.

The secondary seal may be slidably arranged within the access point. Preferably, the secondary seal comprises a plate, which may be generally circular. The access point may comprise sealing members operable to cooperate with the plate to form the secondary seal. In one embodiment, the access point comprises a cylindrical bore having sealing members circumferentially arranged in the wall of the bore and arranged to receive the plate.

Advantageously, the method as described above does not require the pressurized pipe to be depressurized or emptied, because the arrangement of seal ensures that the fluid is always sealed to the outside environment.

All of the features disclosed herein may be combined with any of the above aspects and in any combination.

BRIEF DESCRIPTION OF THE DRAWINGS

For a better understanding of the invention, and to show how embodiments of the same may be carried into effect, reference will now be made, by way of example, to the accompanying diagrammatic drawings in which.

DETAILED DESCRIPTION OF THE INVENTION

Referring first to FIG. 1 there is shown a fluid delivery system 102 of the prior art. The fluid delivery system 102 is taken from a typical swimming pool water treatment facility. Water enters the system 102 via pipe 104 into a pump 106. The pump 106 pumps the water to a filter 110 via pipe 108. The filter 110 operates in a usual manner to filter particulates from the water stream. The filtered water exits the filter 110 via pipe 112, passes through a heater 114, then travels via pipe 116 back toward and eventually re-entering the pool (not shown).

The pipe 108 between the pump 106 and the filter 110 has a probe 118 therein to test the chemical content of the water passing through the pipe 108. The information of the chemical content is passes via a wire 120 to a control unit 122. The control unit 122 is an electronic processing device (powered by power cable 124), which has the ability to receive and process the information of the chemical content of the water. If the chemical content is below a pre-set level, a signal is sent to a pump 128 on a solution tank 130 (via a wire 126) to pump a pre-determined amount of chemicals from the solution tank into the pipe 116, via a dosing pipe 132, which connects the solution tank 130 to the pipe 116.

The prior art system shown in FIG. 1 requires the use of an auxiliary pump (pump 128), to pump the chemicals into the pipe 116. The use of multiple pumps is inefficient and provides more mechanical parts that are liable to failure.

Referring now to FIG. 2, there is shown a further prior art fluid delivery system 202, the system also being part of a swimming pool water treatment facility. An initial pump (such as pump 106) and filter (such as filter 110) are not shown in FIG. 2, although it will be appreciated that such devices may be incorporated into the system 202.

In operation of the system 202 of FIG. 2, water enters a heater 206 via pipe 204 and exits via pipe 208. Pipe 208 has a probe 210 therein to measure the chemical content of the water passing therethrough. The information of the chemical content is passed by a wire 212 to a control unit 214. The control unit is an electrically powered (via electric supply 216) processing device, which is able to receive and process the chemical information from the probe 210. If the chemical content of the water is too low, a signal is sent to a solenoid valve 216, which will be discussed hereunder.

The pipe 208 has a venturi system 218 attached thereto. The venturi system comprises a bypass valve 220 on the pipe 208, operable to regulate the flow through the pipe 208. At a first side of the bypass valve 220, upstream therefrom, is a pipe 222, which extends from the pipe 208. On the pipe 222 leads, via an isolator valve 224, to a venturi unit 226. Leading from the other side of the venturi unit 226 is a pipe 228, which leads back into the pipe 208 (via an isolator valve 230) to a position in the pipe downstream of the bypass valve 220.

The system 202 also has a dosing circuit 232 comprising a pipe 234 extending from the pipe 208 at a position upstream from the pipe 222. The pipe 234 connects the pipe 208 to the solenoid valve 216. The solenoid valve 216 is then connected to a flow meter 238 via a pipe 236. The flow meter 238 is connected to a tablet feeder 244 via a pipe 240 having a manual regulator valve 242 thereon.

The tablet feeder 244 has an inlet 246 and an outlet 248 and an amount of resident water 250 therein. Connected to the inlet 246 and the outlet 248 are float valves 252. Extending from the inlet is a pipe 254 fitted with a spray nozzle which points upward toward a top of the feeder 244. At the top of the feeder 244 is a hopper 256 carrying tablets 258. The hopper 256 has a perforated floor 260. Extending between the outlet 248 of the tablet feeder 244 and the venturi unit 226 of the venturi system 218 is a pipe 262.

In use, the chemical content of the water is monitored by the control unit 214, via the probe 210. Upon detection of a level of chemicals in the water that is too low, the control unit 214 causes the solenoid valve 216 to open. The action of opening the solenoid valve 216 causes water from the pipe 234 to enter the dosing circuit 232. In other words, the water passes through the solenoid valve 216, through the pipes 236, 240 and the flow meter 238 into the tablet feeder 244. The water then exits the pipe 254 via the spray nozzle which sprays water up into the hopper 256 (via the perforated floor 260), thereby slowly dissolving the tablets and allowing the water to fall into the resident water 250. The combination of float operated valves 252 (which operate as switches) coincide to regulate the amount of water 250 resident in the feeder and, when the resident water 250 is sufficiently high, water exits the feeder via the outlet 248, along pipe 262 into the venturi unit 226. The venturi unit 226 has a constant suction (by virtue of the pressure of the water passing therethrough from pipe 222 into pipe 228). Thus the water from pipe 262, which has a high concentration of chemicals (from the tablets 258) solvated therein is added to the water stream.

Advantageously, the prior art system 202 does not require an auxiliary pump, but relies on the positive pressure of the water in the pipe 208 and a venturi unit to inject the chemicals into the water. However, practically, such a system is difficult and cumbersome to install because it requires three pipes and a bypass valve to be added to the main pipe 208. This is particularly difficult where such a system is to be retrofitted to an existing pipe ie. to replace the system of FIG. 1.

Figure 3:
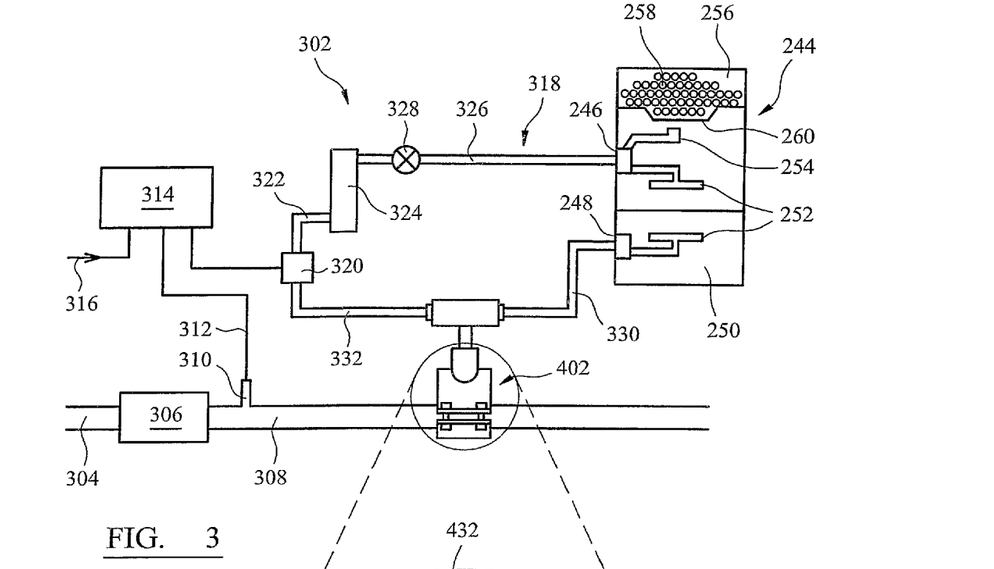
FIG. 3 shows a schematic view of an embodiment of a fluid delivery system of the present invention.

Referring now to FIG. 3 there is shown a fluid delivery system 302 of the present invention. FIG. 3 does not show such features as a pump or filter, but these could be added to the system in the usual manner, preferably upstream of the system in FIG. 3. Shown in FIG. 3 is a pipe 304 that carries water to a heater 306, which has an outlet pipe 308 that channels water back to the pool (not shown). Situated on the pipe 308 is a fluid delivery device 402 of the present invention, which will be described in detail in relation to FIG. 4, hereunder. The system 302 comprises a probe 310 in pipe 308, which is connected to a control unit 314, via wire 312. The control unit 314 is electrically powered (via electric wire 316) and operates in a similar manner to the control unit 214 described above in relation to FIG. 2.

The system 302 comprises a dosing circuit 318, comprising a solenoid valve 320, connected to the control unit 314, a pipe 322 between the solenoid valve 320 and a flow meter 324. The flow meter 324 has a pipe 326 extending therefrom and having a manual regulator valve 328 thereon. The pipe 326 extends into an inlet 246 of a tablet feeder 244. The tablet feeder 244 operates in a similar manner to that described above in relation to FIG. 2, and has been labelled with the same numerals for ease of understanding. Extending from the outlet 248 of the tablet feeder 244 is a pipe 330 which extends into the fluid delivery device 402. A pipe 332 extends between the fluid delivery device and the solenoid valve 320, thus completing the circuit 318.

The fluid delivery device 402 will be described in detail hereunder, but in brief, it comprises means to remove fluid from the pipe 308 into the pipe 332 and means to inject fluid from the pipe 330 into the pipe 308. Therefore, the system operates in a similar manner to the prior art system 202 in that upon detection of a chemical composition of the fluid that is below the accepted level (by the probe 310 and the control unit 314) the solenoid valve 320 opens, thus opening the dosing circuit 318 by allowing water to pass through the solenoid into the pipe 322 and thus through the tablet feeder 244 causing chemically enriched water to be injected into the water flow in the pipe 308 via the fluid delivery device 402.

It will be understood by one skilled in the art that the manual regulator valve 328 regulates the flow of water through the dosing circuit 318, thus ultimately controlling the speed at which chemicals are injected into the pipe 308.

Figure 4:
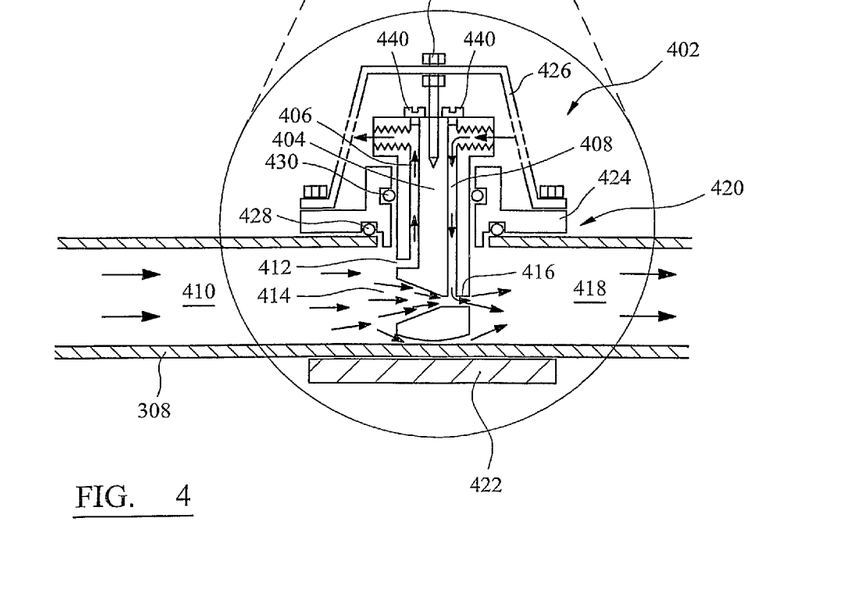
FIG. 4 shows an enlarged cross sectional view of a part of FIG. 3 showing an embodiment of a fluid delivery device of the present invention.

Referring now to FIG. 4, there is shown in cross section an enlarged view of the fluid delivery device 402 arranged about the pipe 308 of FIG. 3. Arrows in the figure depict the direction of movement of fluid. The device 402 comprises a generally cylindrical piston 404 which extends down into an interior of the pipe 308. The piston comprises an inlet channel 406 and an outlet channel 408. The inlet channel is situated at the upstream 410 side of the piston 404 and has an opening 412 situated within the interior of the pipe 308 The inlet channel 406 draws water from the pipe 308 and diverts it up the pipe 332 of FIG. 3, into the dosing circuit 318. At upper ends of the channels 406, 408 are plugs 440 which can be removed for servicing the channels (for cleaning or unblocking interiors thereof with rods etc.).

Toward a bottom end of the piston 404, at an upstream 410 side thereof is a circular aperture 414 that funnels inward toward a cylindrical centre of the piston 404, then becoming a cylindrical aperture 416 having parallel walls that extends out of the other side of the piston 404, at the downstream 418 side of the piston 404. A lower extent of the outlet channel 408 opens into the cylindrical aperture 416 proximal to the downstream 418 side of the piston 404. An upper end of the outlet channel 408 is connected to the pipe 330 in the dosing circuit of FIG. 3.

In use, as the water enters the aperture 414, it is funneled, thus accelerated, into the narrower cylindrical aperture 416. This fluid, having been accelerated is thus under a reduced pressure and the reduced pressure causes the fluid in the outlet channel 408 to be drawn into the aperture 416 and thus into the pipe 308.

Fitting the device 402 of FIG. 4 onto a pipe, such as pipe 308 is an easy one step process. The device is fitted with a saddle 420 that fixes around an exterior of the pipe 308. The saddle 420 comprises a lower portion 422 that is secured via nuts/bolts to an upper portion 424 and a cover portion 426. The cover portion 426 may alternatively be a part of the bracket. The upper portion comprises a circular seal 428 in a base arranged to abut an upper surface of the pipe 308 and a further seal 430 arranged to circumferentially surround the piston 404.

The piston 404 is longitudinally movable to alter the amount of water flow thereunder, and thus the amount of water through the aperture 414, thus the amount of suction at the outlet channel 408. This movement is facilitated by a screw 432 in the cover means, rotation of which causes upward/downward movement of the piston 404. Optionally, a clamp or bracket arrangement (not shown) may be provided to hold the piston in place with regard to the saddle, for example, to prevent unwanted upward or downward movement of the piston which may be caused by pressure within the pipe.

In one embodiment, the piston and the saddle may have a corresponding thread, thereby allowing the piston to screw into the saddle and facilitate upward or downward adjustment. In such an embodiment, alignment means, such as marking indicia may be provided, for example, on the piston head, to show, for example, full rotations of the piston. In this manner, the delivery conduit of the piston can be correctly aligned within the pressurized pipe relative to the upstream/downstream flow inside the pipe and the efficiency thereof maintained/maximised.

To fit the device 402 of the present invention to a pipe 308, a single hole may be made in the pipe, the piston 404 and top part of the saddle inserted into the hole and fixed with the remainder of the saddle.

In this manner, a fluid delivery device is provided that does not require auxiliary pumps and does not require the fixing of many auxiliary pipes to the pipe 308.

Figure 5:
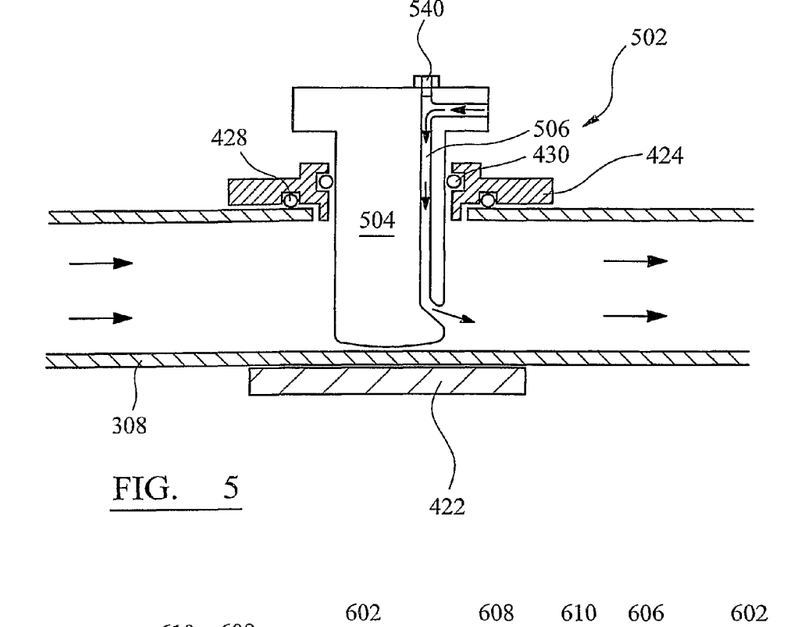
FIG. 5 shows an enlarged cross-sectional view of a second embodiment of a fluid delivery device of the present invention.

Referring now to FIG. 5, there is shown an enlarged cross sectional view of an alternative embodiment of a fluid delivery device 502. The device is fitted to the pipe 308 via a saddle 420. The cover portion of the saddle 426 is not shown for simplicity.

The fluid delivery device 502 comprises a piston 504 having an outlet channel 506 similar to the channel 408 described above, except that, rather than opening into an aperture, it opens toward a downstream corner of the piston into the pipe 308. The piston 504 has a rounded bottom end 508 and water flowing under and therearound is accelerated, thus lowering the pressure. This reduced pressure sucks the water from the outlet channel 506

At an upper end of the channel 506 is a plug 540 which can be removed for servicing the channel (for cleaning or unblocking interiors thereof with rods etc.).

It will be appreciated that an inlet channel, similar to that described above in relation to piston 404 may be added to the piston 504. Alternatively, an inlet pipe may be added to the tube 502, upstream from the device 502.

Figure 6:
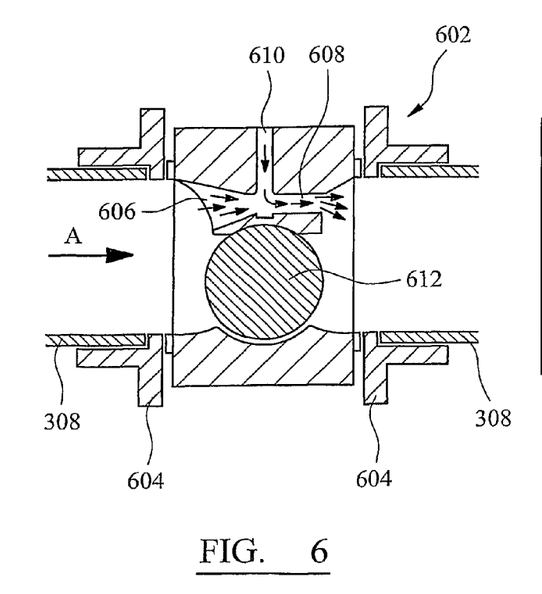
FIG. 6 shows a cross sectional view of a third embodiment of a fluid delivery device of the present invention.
Figure 7:
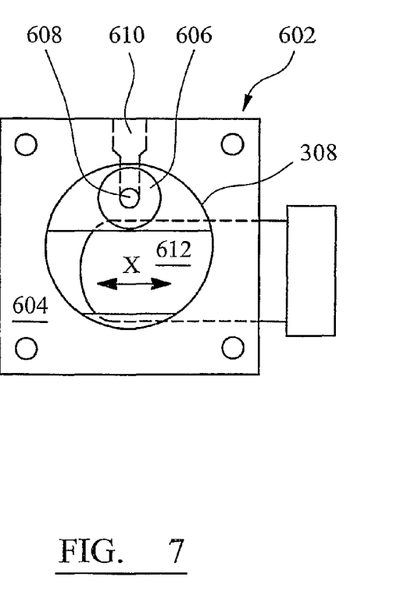
FIG. 7 shows a side on perspective view of the fluid delivery device of FIG. 6.

Referring now to FIGS. 6 and 7, there is shown a further embodiment of a fluid delivery device 602. This embodiment is in the form of a block that is inserted between two pipes (or a pipe that has been cut in two). The block is secured in place between two butt flanges 604. In the device 602, suction into the pipe (labelled 308 again), is provided by a funnel shaped aperture 606 into which water flows, narrow into a cylindrical portion 608. Opening into the cylindrical portion 608 is an outlet channel 610. This could be arranged to be connected to the pipe 330 of the system 302 shown in FIG. 3. The device 602 also comprises a piston 612, which can be inserted into the pipe 308 to restrict the flow therethrough, thereby forcing less or more water through the aperture 606 and thus altering the amount of suction through the channel 610. FIG. 7 shows the device 602 of FIG. 6 as viewed from arrow "A" of FIG. 6. In this view the potential calibration movement of the piston is shown by double headed arrow "X".

Figure 8:
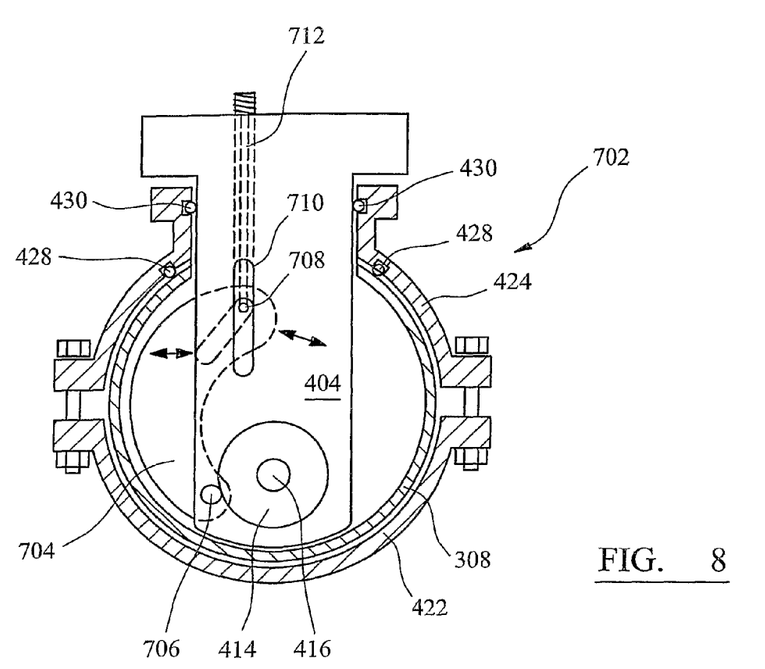
FIG. 8 shows a cross sectional view of a fourth embodiment of a fluid delivery device.

Referring now to FIG. 8 there is shown a cross sectional view of a further embodiment of a fluid delivery device 702. The fluid delivery device 702 is similar to the device 402 described above, and like parts are numbered alike for ease of reference. The device 702 differs from the device 402 in that it is fitted with a flaring member 704. The flaring member 704 is pivoted to the piston 404 via a pivot 706 situated toward a bottom end of the piston 404. The flaring member is generally kidney shaped, and is connected toward an upper end thereof to a slidable member 708 that is housed within a sliding recess 710 within the piston 504. The slidable member 708 is connected to an adjusting screw 712, which can be turned to adjust the position of the flaring member with regard to the piston 404. In this manner, the flaring member is arranged for movement relative to the piston 404 such that in a flared position it extends into the bore of the pipe 308 (as shown in FIG. 8) and an unflared position (not shown), where the flaring member is housed within the body of the piston 404.

In use, the flaring member 704 may be adjusted so as to flare into or out of the bore of the pipe 308, thus offering means to further restrict the flow of fluid through the pipe 308 to thereby increase or decrease the flow through the aperture 414/416.

It will be appreciated that similar flaring devices can be added to the devices of FIGS. 5, 6 and 7.

It will be appreciated that the piston of the devices described above may be formed as a single or composite unit.

Figure 9:
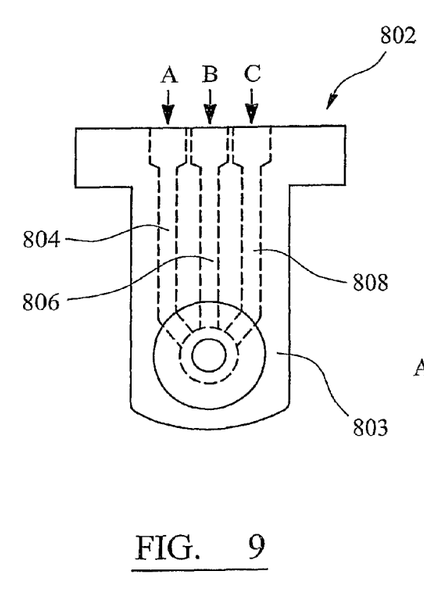
FIG. 9 shows a cross sectional view of a fifth embodiment of a fluid delivery device.

Referring now to FIG. 9 and there is shown a fifth embodiment of fluid delivery device 802. The embodiment is in many ways similar to that described above in relation to FIG. 4, except that the piston comprises three separate channels 804, 806, 808 as best displayed in FIG. 9. In this manner, the device may be used to introduce different components into the main body of fluid running through the main pipe (as indicated by the arrows marked "A" on FIG. 10. For example, the device could be used as a mixer. Alternatively or additionally, one or more of the channels 804, 806, 808 could be used to feed gauge instruments into the flow of fluid through the pipe (as indicated by arrows marked "A" in FIG. 10).

Figure 10:
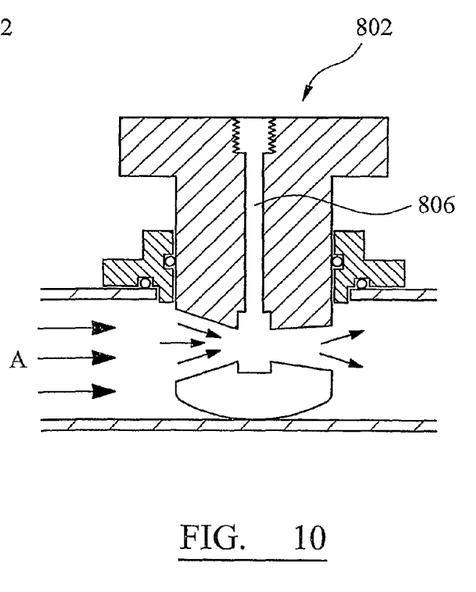
FIG. 10 shows an alternative cross sectional view of the fluid delivery device of FIG. 9.

FIG. 10 is a cross sectional view through the piston 803 of FIG. 9, so only one channel 806 is shown. However, it will be appreciated by one skilled in the art that alternative cross sections would have shown other channels 804, 808.

Figure 11:
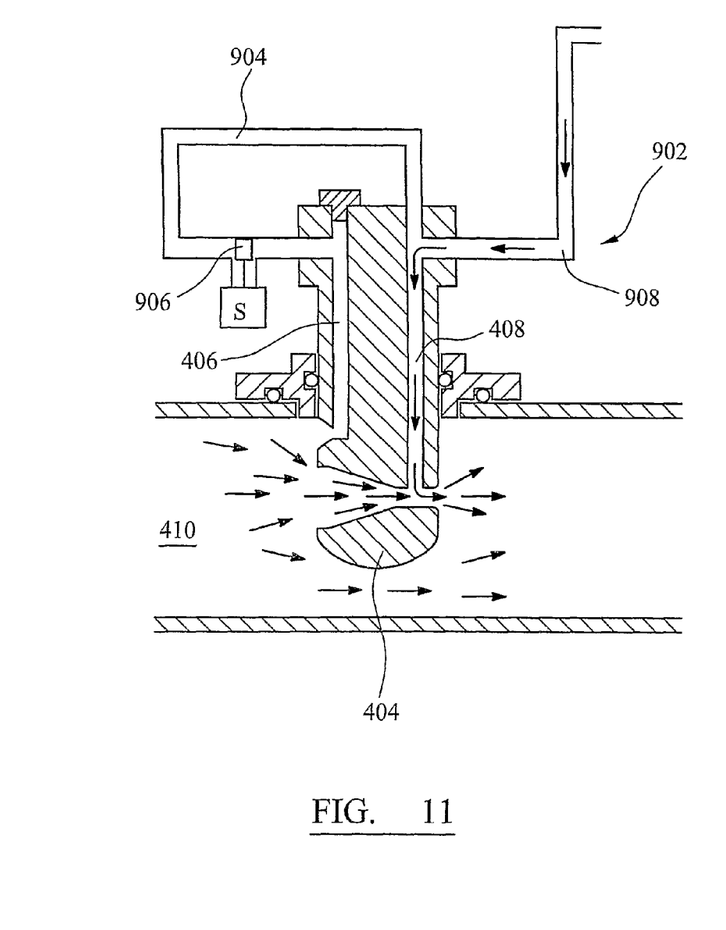
FIG. 11 shows a cross sectional view of a sixth embodiment of a fluid delivery device in a first configuration.
Figure 12:
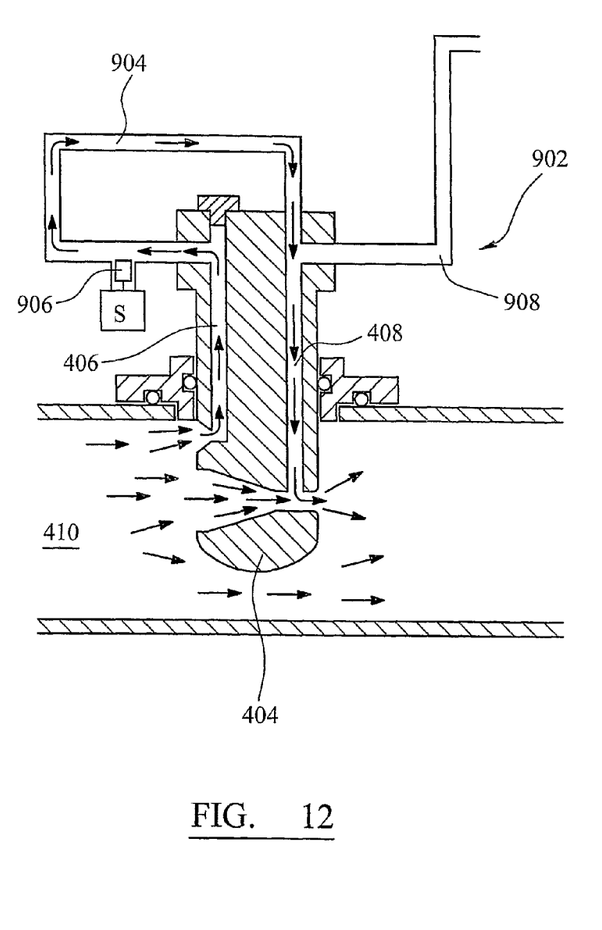
FIG. 12 shows a cross sectional view of the sixth embodiment of a fluid delivery device in a second configuration.

Referring now to FIGS. 11 and 12 there is shown cross sectional views of a sixth embodiment of the fluid delivery device 902 in a first configuration (FIG. 11) and a second configuration (FIG. 12). The pipe and piston arrangement is similar to that described above in respect of FIG. 4 and like parts will be numbered alike for ease of understanding. However, the conduits exiting the piston are arranged in an alternative manner, which will be described in detail hereunder.

In this sixth embodiment, an inlet channel 406 exits an upper portion of the piston 404 via a conduit 904. This conduit 904 loops around and re-enters a top side of the piston 404 at a point proximal to an outlet channel 408. The conduit 904 then joins the outlet channel 408 at an interior of the piston in a T joint. Also entering the outlet channel 408 at this point is a further conduit 908 which is attached to a tank of dosing chemicals, in a similar manner to the pipe 330 of FIG. 3, for example.

Along the conduit 904 is a solenoid valve 906 which is operable to allow (in a disengaged position) or prevent (in an engaged position) the flow of fluid through the conduit 904. The operation of the solenoid valve 906 thereby alters the flow of fluid through the conduit 904 and into the outlet channel 408. The different flows through the conduit 904 (and thus the outlet channel 408) are shown diagrammatically in FIGS. 11 and 12. The arrows in FIGS. 11 and 12 show the flow of fluid through and around the device.

Referring first to FIG. 11, there is shown a configuration where the solenoid valve 906 is engaged, thus the conduit 904 is blocked by the solenoid valve 906 and the flow of fluid therethrough is prevented. In this configuration, fluid is drawn through the outlet pipe 408 into the pipe 410 via the conduit 908. Accordingly, in the configuration of FIG. 11 the fluid in the pipe 910 is being dosed by chemicals from a tank (not shown) attached to the conduit 908.

Referring now to FIG. 12, the solenoid valve is disengaged, thus the flow of fluid though the conduit 904 is allowed. In such a scenario, the suction caused in the device is satisfied by the fluid flowing through the conduit 904, thus no chemicals are drawn through the conduit 908 and the fluid flowing through the pipe 410 is not being dosed with chemicals.

The arrangement shown in FIGS. 11 and 12 and as described above is particularly advantageous because chemical dosing agents often have a tendency to solidify from solution and clog up mechanical devices (via depository build up) causing the operation thereof to be difficult or causing mechanical failure thereof. Accordingly, placing a valve on the conduit 908 would be liable to mechanical failure and would require regular cleaning and maintenance. However, in the arrangement as described above and as disclosed in FIGS. 11 and 12, the conduit 908 does not include mechanical flow interruption means, thus this problem is alleviated. Moreover, the corner at which chemicals enter the outlet channel 408, which would also potentially be liable to depository build up, can be washed by circulating fluid from the pipe 410 through the conduit 904.

Figure 13:
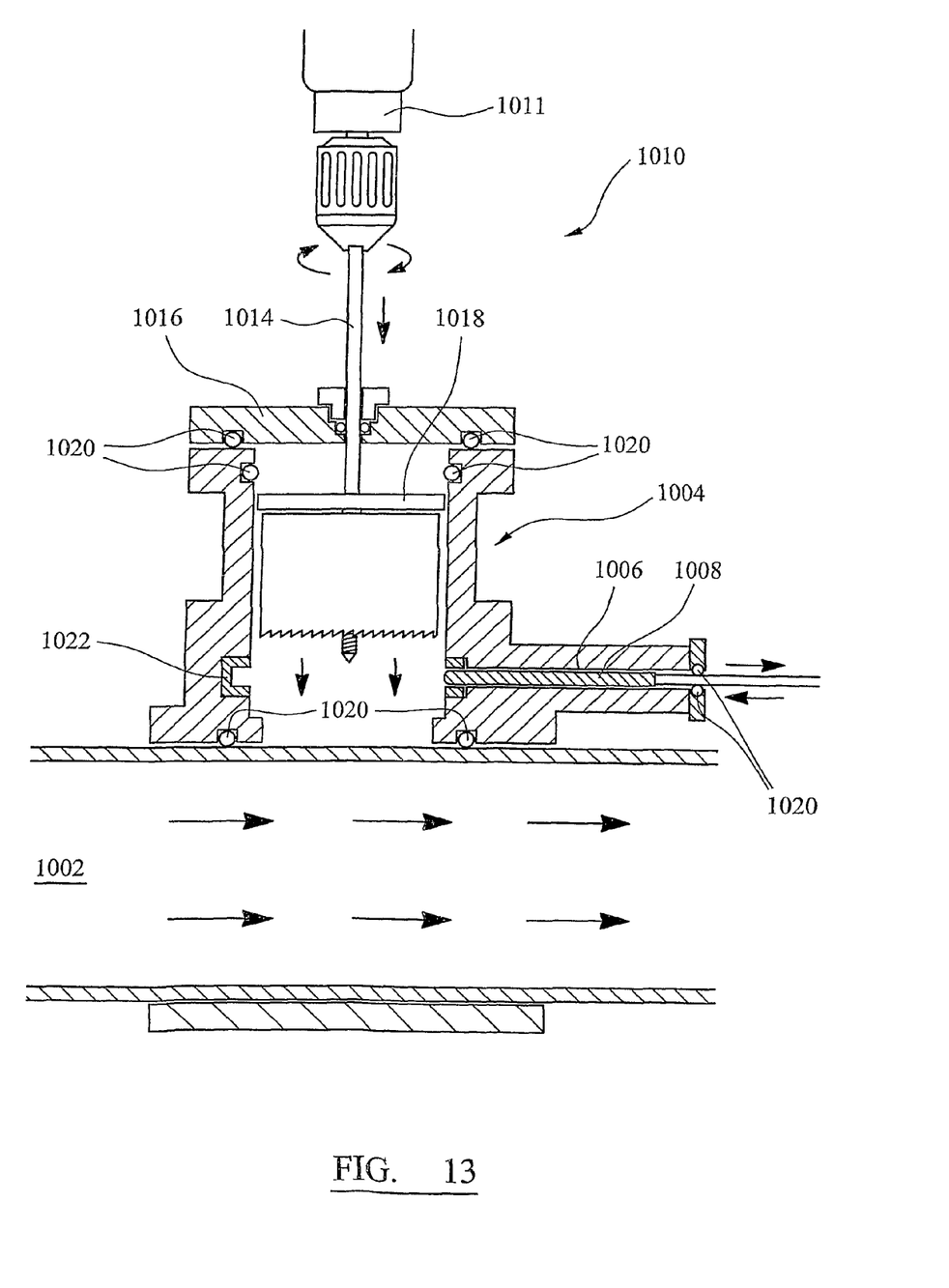
FIG. 13 shows a cross sectional view of a device for fitting a fluid delivery device to a pipe in a preliminary configuration.
Figure 14:
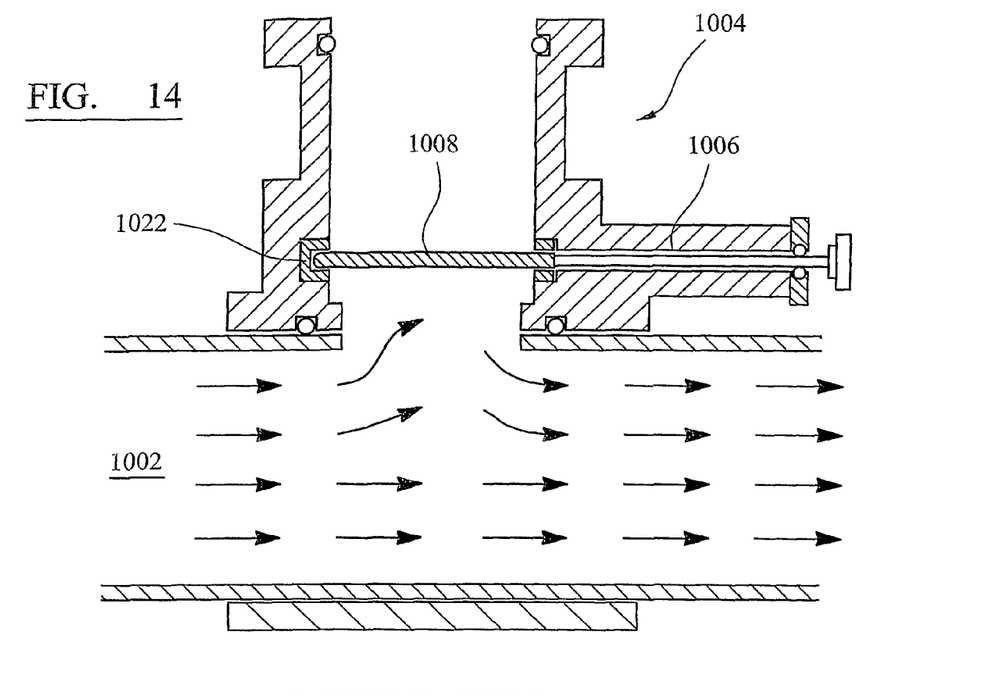
FIG. 14 shows a cross sectional view of a device for fitting a fluid delivery device to a pipe in a second configuration.
Figure 15:
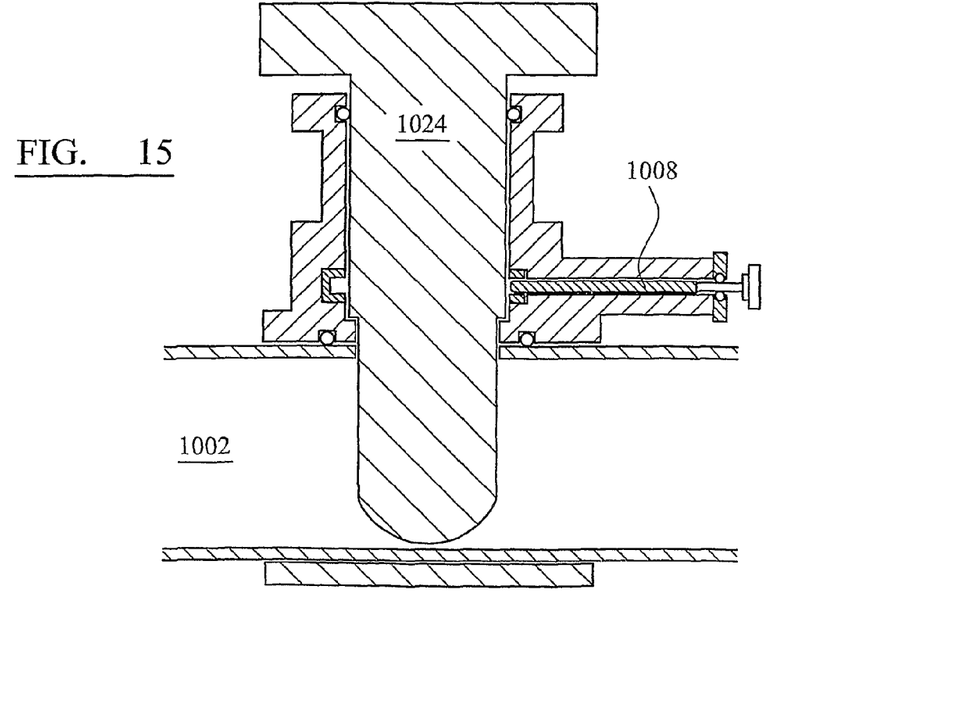
FIG. 15 shows a partial cross sectional view of a fluid delivery device fitted to a pipe using the device of FIGS. 13 and 14.

Referring now to FIGS. 13 to 15 there is shown a series of cross sectional schematic drawings of a method of attaching the fluid delivery device of any of the above embodiments to a pipe, without the need to depressurize or empty the pipe of fluid.

Referring firstly to FIG. 13, there is shown a pipe 1002 having a fluid flowing therethrough as indicated by arrows in the pipe. The wall of the pipe is, at this point, intact. Arranged about the pipe is a saddle 1004, which is held securely in place by clamping means (not shown). The saddle 1004 is similar to the saddle 420 described above in relation to FIG. 4. However, the saddle 1004 comprises a side entry channel 1006 having a slidable plate 1008 arranged therein. Fitted to the top of the saddle 1004 is a drilling arrangement 1010 comprising a drill 1011 having a cutting ring 1012 attached thereto via a shaft 1014 that extends through an aperture in a saddle lid portion 1016. Arranged above the cutting wheel 1012 is a circular guide portion 1018 designed to closely fit an internal bore of the saddle 1004. The saddle and drilling arrangement comprises a number of sealing elements 1020.

In use, the drill is rotated and a downward force applied thereto in a usual manner causing the cutting ring 1012 to breech the exterior wall of the pipe 1002. At this point, the internal volume (bore) of the saddle arrangement is flooded with fluid, but the fluid is prevented from escaping the saddle by the various sealing elements 1020. Upon continued drilling a circular aperture is formed in a wall of the pipe 1002 and the cutting ring 1012 is withdrawn upward back into the internal bore of the saddle 1004. At this stage the slidable plate 1008 is moved into the internal bore and receive in a sealing member 1022 in the walls of the bore of the saddle 1004. The drilling arrangement 1010 may then be removed, as shown in FIG. 14.

FIG. 14 shows the intermediate stage of fitting the fluid delivery device to a pipe 1002. a circular aperture has been cut into the wall of the pipe 1002 and the drilling arrangement 1010 has been removed. Fluid in the pipe is prevented from escaping by the plate 1008 blocking the internal bore of the saddle 1004.

Next, a piston arrangement is added to the saddle 1004. It will be appreciated by one skilled in the art that any of the pistons described above with relation to any of the embodiments may be added. However, for the sake of simplicity, a simple piston 1024 having no internal channels is shown in FIG. 15. The piston is a very close fit with the internal bore of the saddle 1004, thus the piston is partially inserted into the bore of the saddle, the slidable plate 1008 retracted back into the side entry channel 1006 and the piston then inserted through the aperture in the pipe wall, as shown in FIG. 15.

The channels 406, 408 506, 610, 804, 806, 808 may each optionally be fitted with an isolation valve or non return valve (not shown).

A fluid delivery device made in accordance with the present invention allows a user to inject a fluid into a positive pressure fluid line without the use of auxiliary pumps, or the need to add a large number of extra components as with the prior art system of FIG. 2. Instead, a device is provided that is easy to install and requires minimal room. Particularly, in retrofit situations, where room for maneuvering existing pipework may be limited, the device of the present invention is quick and easy to fit.

The fluid delivery device of the present invention can also be provided with a plurality of outlet channels to thereby allow many different fluids to be delivered into a pipe. Also, in this manner the device may be used as a mixing device.

Further, a manner of fitting a fluid delivery device to a pipe without the need to depressurize or empty the pipe is also described. This is a particularly advantageous method and allows work to be carried out on a system without the need to put the system off line.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A fluid delivery device for fixing to and delivering a fluid into a pressurized pipe, the device comprising flow restriction means operable to restrict a flow of fluid through the pipe, thereby generating a restricted flow region within the pipe at the position of the flow restriction means, as compared to an unrestricted flow upstream of the device, the device further comprising a delivery conduit arranged to open into or proximal to the restricted flow region, wherein the flow restriction means is adjustable so as to alter the amount of restriction of the flow within the pipe, wherein the flow restriction means comprises an aperture through which the fluid in the pipe may travel, and wherein the aperture is generally funnel shaped.

2. A fluid delivery device according to claim 1, wherein the flow restriction means is arranged to extend into the pipe at an angle generally perpendicular to a longitudinal axis thereof.

3. A fluid delivery device according to claim 1, wherein the flow restriction means comprises flaring means, operable to spread outward to thereby occupy a greater volume within the pipe.

4. A fluid delivery device according to claim 3, wherein the flaring means is adjustable.

5. A fluid delivery device according to claim 1, wherein the device further comprises an outlet operable to allow fluid from within the pipe out of the pipe.

6. A fluid delivery device according to claim 1, wherein the aperture comprises a tapered region, tapering in a downstream direction, thus causing fluid flowing therethrough to accelerate in a downstream direction.

7. A fluid delivery device according to claim 1, wherein the aperture comprises a region of generally constant cross section.

8. A fluid delivery device according to claim 1, wherein the aperture has a tapered section that connects to a section of generally constant cross section.

9. A fluid delivery device according to claim 1 wherein, the delivery conduit opens into the aperture.

10. A fluid delivery device according to claim 1, wherein the delivery conduit opens proximal to a lower extent of the flow restriction means.

11. A fluid delivery device according to claim 10, wherein the flow is restricted between the lower extent of the flow restriction means and a wall of the pipe.

12. A fluid delivery device according to claim 1, wherein the delivery conduit is situated within the flow restriction means.

13. A fluid delivery device according to claim 1, wherein the device is fitted to a pipe by inserting the flow restriction means into the pipe and adding a saddle fitting about the pipe.

14. A fluid delivery device according to claim 1, wherein the device is fitted between two ends of pipe to thereby form a continuous pipe.

15. A method of delivering a fluid into a pressurized pipe, the method comprising adding flow restriction means within the pipe to thereby generate a restricted flow region within the pipe at the position of the flow restriction means, as compared to an unrestricted flow upstream of the flow restriction means, and arranging a delivery conduit to open into or proximal to the restricted flow region, wherein the flow restriction means is adjustable so as to alter the amount of restriction of the flow within the pipe, wherein the flow restriction means comprises an aperture through which the fluid in the pipe may travel, and wherein the aperture is generally funnel shaped.

16. A method of attaching a fluid delivery device to a pressurized pipe, the method comprising:
arranging a saddle about a pressurized pipe, the saddle comprising an access point to allow a hole forming apparatus access to the pressurized pipe,
arranging the hole forming apparatus about the access point of the saddle, the hole forming apparatus being substantially sealed with the saddle via a first seal;
using the hole forming apparatus to form a hole in a wall of the pressurized pipe;
forming a secondary seal in the access point at a position between the formed hole and the first seal; and
removing the first seal and inserting flow restriction means of the fluid delivery device into the access point of the saddle, thereby forming a tertiary seal wherein the flow restriction means is adjustable so as to alter the amount of restriction of the flow within the pipe, wherein the flow restriction means comprises an aperture through which the fluid in the pipe may travel, and wherein the aperture is generally funnel shaped.

* * * * *